C. MERRY.

Hub.

No. 18,855.

Patented Dec. 15, 1857.

UNITED STATES PATENT OFFICE.

CORNELIUS MERRY, OF NEW YORK, N. Y.

HUB OF CARRIAGE-WHEELS.

Specification of Letters Patent No. 18,855, dated December 15, 1857.

*To all whom it may concern:*

Be it known that I, C. MERRY, of the city, county, and State of New York, have invented a new and useful Improvement in Wheel-Hubs; and I do hereby declare that the following is a full, clear, and exact description of the construction and operation of the same, reference being had to the annexed drawing, forming part of this specification, in which—

Figure 1:
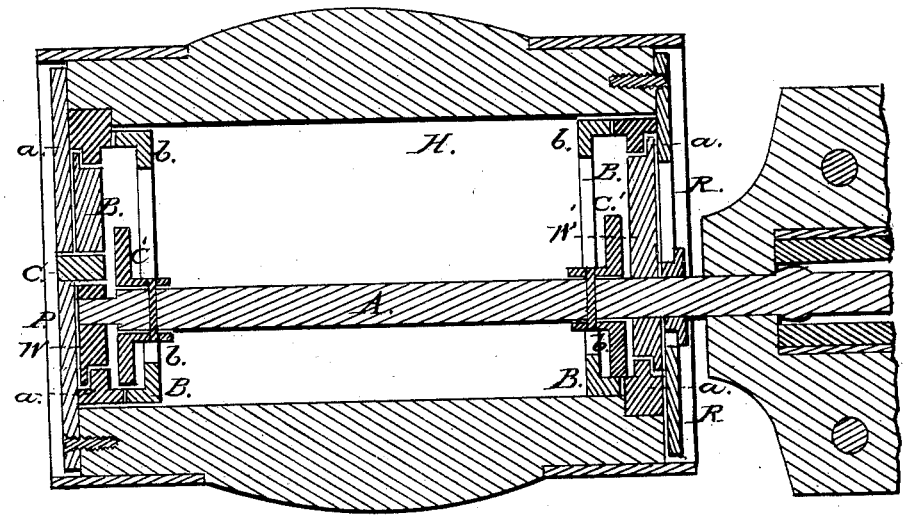
Figure 2:
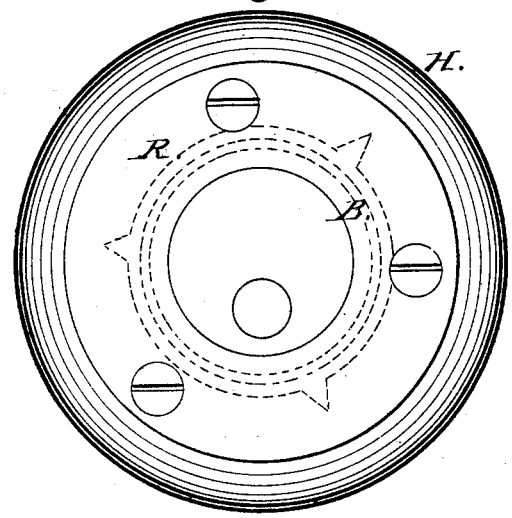

Figure 1 is a longitudinal section of hub and axle, taken through axes of same. Fig. 2 is an end view of the hub.

Similar characters of reference in the several figures denote the same part.

The nature of my invention consists in a peculiar construction of hub and axle hereinafter to be set forth, whereby the surfaces in contact will be but small, and a corresponding diminution of friction attained, the details of construction and operation being as follows:

In the drawing H is the hub bored out as shown in Fig. 1. In each extremity of the hub is a box, B, each with two interior flanges $a\ b$. The axle arm A is of small diameter, and has secured to it two small wheels C C', which rest in the grooves between the flanges $a$ and $b$ of the boxes B. The axle arm also passes eccentrically through two other wheels W W', which rest upon and bear against the flanges $a$ of the boxes B as shown in Fig. 1. The wheel W is hung upon a journal $c$ attached to an end plate P secured to the hub; the axis of this journal being coincident with that of the hub. Wheel W' is kept in position by the ring R secured to the inner end of the hub.

By this construction the surfaces in contact are the flanges $a$ and wheels W W'; the boxes moving upon these wheels. The wheels C C' resting in the grooves between the flanges $a\ b$, serve to support the axle arms and strengthen the system.

The advantage of this construction lies in the diminution of friction, and in admitting of a very light axle arm.

I claim—

The combination of boxes B, wheels W W', securing plates P and R and wheels C C' with the small axle arm A; constructed and operating substantially as described.

In testimony whereof I have hereunto signed my name before two subscribing witnesses.

CORNELIUS MERRY.

Witnesses:
H. C. BANKS,
JAMES UPTON.